(12) United States Patent
Ueno et al.

(10) Patent No.: US 11,084,501 B2
(45) Date of Patent: Aug. 10, 2021

(54) AUTOMATIC DRIVING CONTROL PLANNING APPARATUS AND AUTOMATIC DRIVING CONTROL PLANNING METHOD

(71) Applicant: MITSUBISHI ELECTRIC CORPORATION, Tokyo (JP)

(72) Inventors: Yoshinori Ueno, Tokyo (JP); Mitsuo Shimotani, Tokyo (JP); Yoshitaka Nakamura, Tokyo (JP); Naohiko Obata, Tokyo (JP); Tadashi Miyahara, Tokyo (JP); Tomohiro Shiino, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 272 days.

(21) Appl. No.: 16/333,611

(22) PCT Filed: Nov. 16, 2016

(86) PCT No.: PCT/JP2016/083916
§ 371 (c)(1),
(2) Date: Mar. 15, 2019

(87) PCT Pub. No.: WO2018/092201
PCT Pub. Date: May 24, 2018

(65) Prior Publication Data
US 2019/0263427 A1  Aug. 29, 2019

(51) Int. Cl.
*B60W 60/00* (2020.01)
*B60W 50/14* (2020.01)
(Continued)

(52) U.S. Cl.
CPC .......... *B60W 50/14* (2013.01); *B60W 30/00* (2013.01); *B60W 30/18* (2013.01);
(Continued)

(58) Field of Classification Search
CPC ... B60W 2050/007; B60W 2050/0095; B60W 2050/0096; B60W 50/082; B60W 60/005;
(Continued)

(56) References Cited

U.S. PATENT DOCUMENTS

2016/0347327 A1    12/2016  Kondo et al.
2017/0010612 A1*    1/2017  Asakura ............... G01S 17/86
(Continued)

FOREIGN PATENT DOCUMENTS

JP    2015-157604 A    9/2015
WO   WO 2018/100725 A1  6/2018

OTHER PUBLICATIONS

International Search Report (PCT/ISA/210) issued in PCT/JP2016/083916, dated Jan. 31, 2017.

*Primary Examiner* — Christian Chace
*Assistant Examiner* — Jordan S Fei
(74) *Attorney, Agent, or Firm* — Birch, Stewart, Kolasch & Birch, LLP

(57) ABSTRACT

An automatic driving control plan creator creates a plan of an automatic driving section where a subject vehicle is automatically driven, and a plan of a driving switching preparation section for switching the subject vehicle from automatic driving to manual driving. A driving load calculator predicts, for each point of the driving switching preparation section, a driving load applied to a driver when the driver manually drives the subject vehicle. A driving switching permission determiner extracts, from the driving switching preparation section, a switching-inhibited section that is a section where switching from automatic driving to manual driving is not permitted, on the basis of the predicted driving load at each point. A driving switching preparation section compensator changes a start point of the driving switching preparation section so as to lengthen the driving switching (Continued)

preparation section in accordance with the length of the switching-inhibited section.

20 Claims, 14 Drawing Sheets

(51) Int. Cl.
*B60W 30/18* (2012.01)
*B60W 30/00* (2006.01)
*B60W 50/00* (2006.01)

(52) U.S. Cl.
CPC ... *B60W 50/0097* (2013.01); *B60W 2050/007* (2013.01); *B60W 2556/00* (2020.02)

(58) Field of Classification Search
CPC ......... B60W 60/0051; B60W 60/0053; B60W 60/0055; B60W 60/0057; B60W 60/0059; B60W 60/0061; G05D 1/0061
See application file for complete search history.

(56) References Cited

U.S. PATENT DOCUMENTS

| | | | |
|---|---|---|---|
| 2017/0203770 A1* | 7/2017 | Kondo | G05D 1/0088 |
| 2018/0088574 A1* | 3/2018 | Latotzki | G05D 1/0251 |
| 2018/0173227 A1* | 6/2018 | Mukai | B60W 50/0097 |
| 2020/0148214 A1* | 5/2020 | Tamagaki | B60W 30/14 |

* cited by examiner

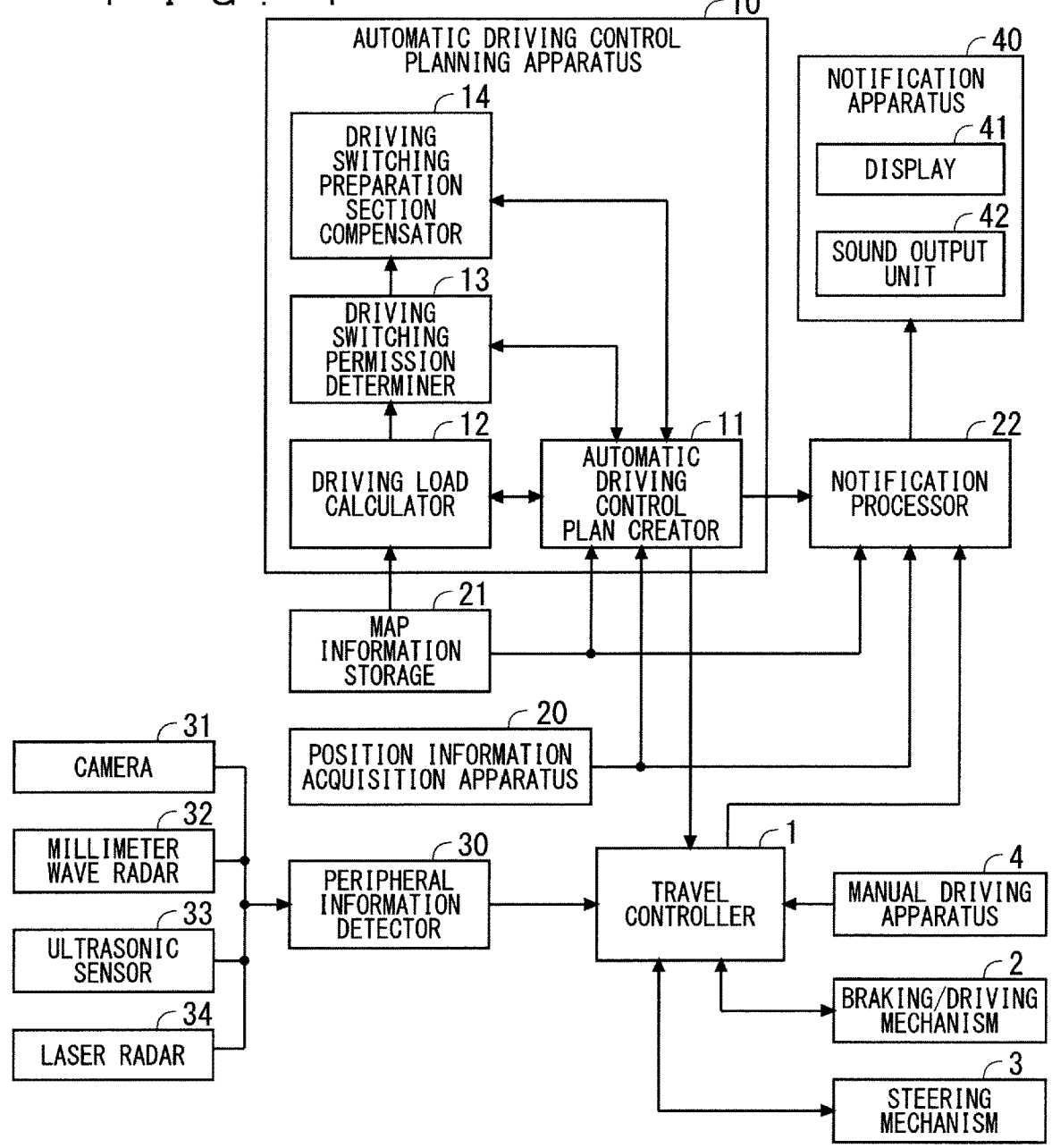

| VISIBLE DISTANCE (d) | DRIVING LOAD (W2) |
|---|---|
| d<50m | 3 POINTS |
| 50m≦d<100m | 2 POINTS |
| d≧100m | 0 POINTS |

| ROAD ATTRIBUTE | DRIVING LOAD (W3) |
|---|---|
| INTERSECTION | 5 POINTS |
| BRANCH POINT | 3 POINTS |
| JUNCTION | 3 POINTS |
| OTHER | 0 POINTS |

F I G . 9
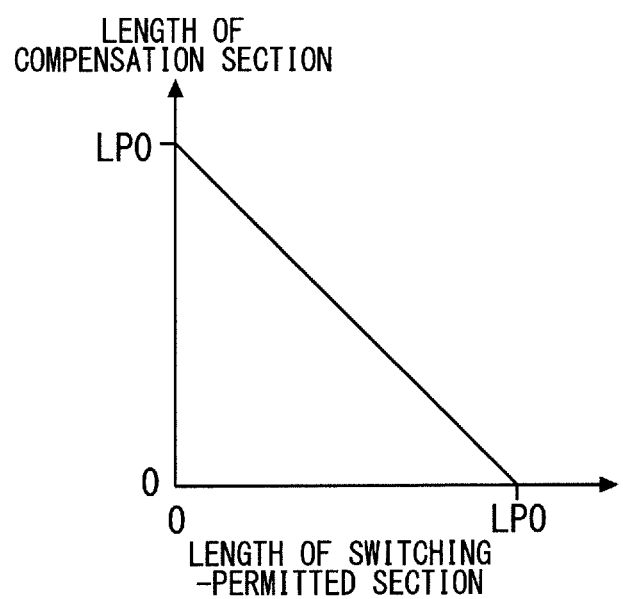
F I G . 1 0
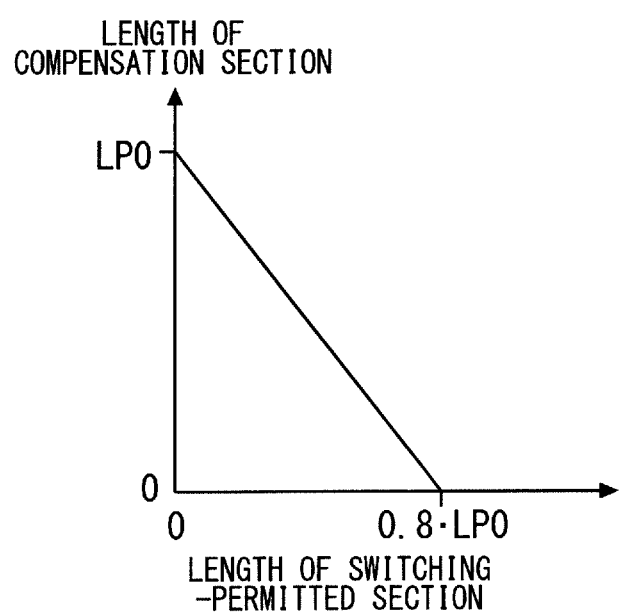

AUTOMATIC DRIVING IS TO BE
TERMINATED AND SWITCHED
TO MANUAL DRIVING.

20 MINUTES BEFORE CANCELATION
OF AUTOMATIC DRIVING 20  15  10
REMAINING TIME
[MINUTES]

FIG. 25
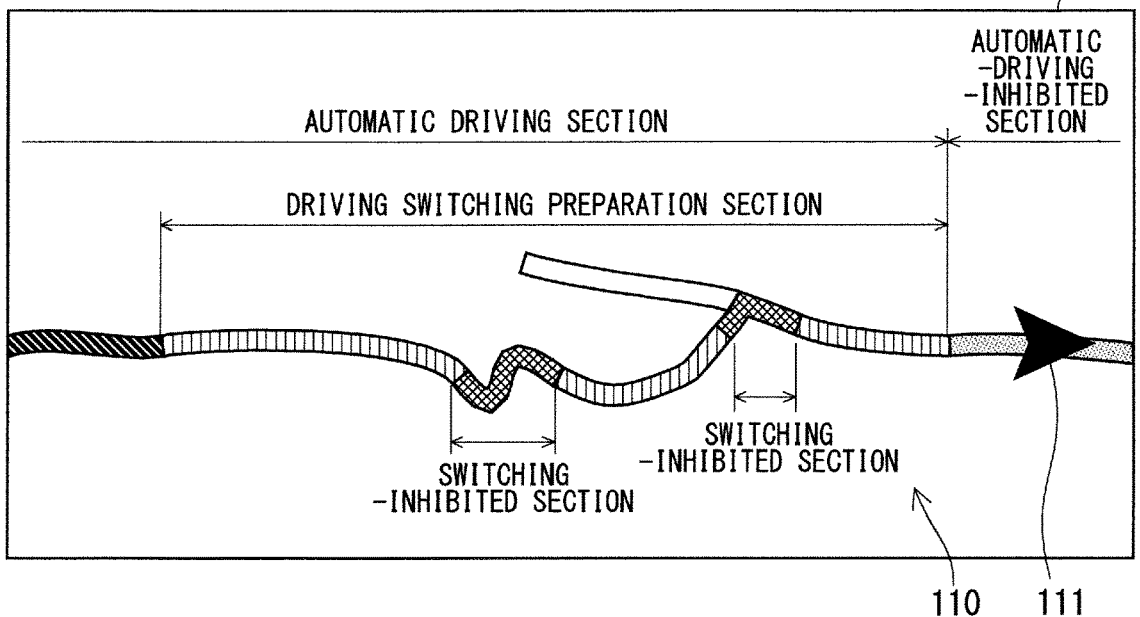
FIG. 26
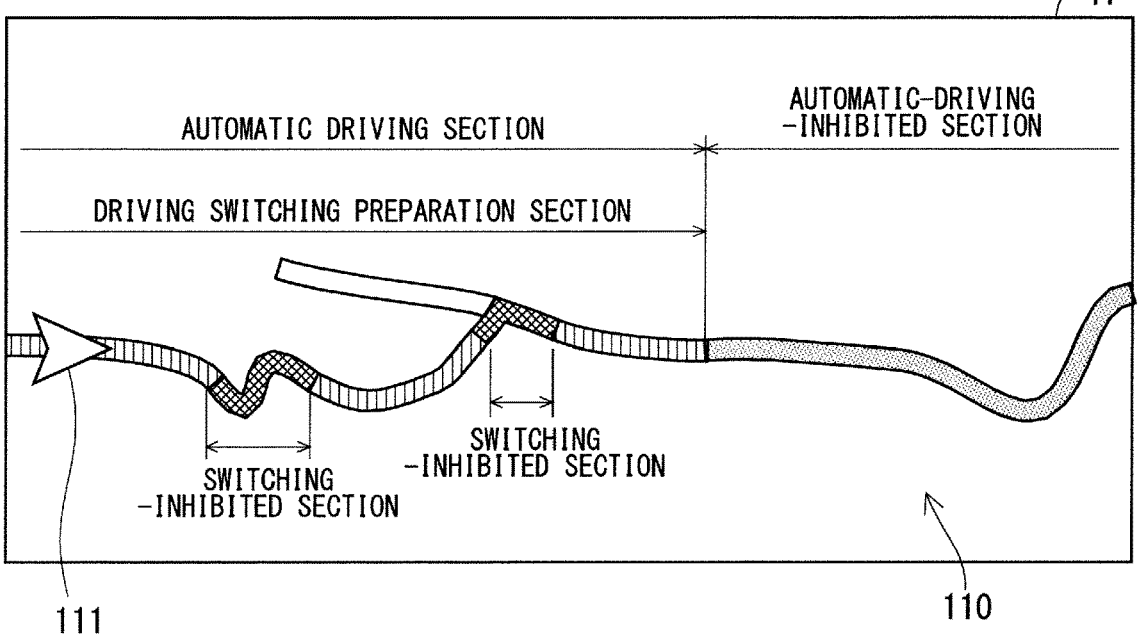
FIG. 27
```
┌─────────────┐ 50
│ PROCESSING  │
│   CIRCUIT   │
└──────┬──────┘
       │
```

AUTOMATIC DRIVING CONTROL PLANNING APPARATUS AND AUTOMATIC DRIVING CONTROL PLANNING METHOD

TECHNICAL FIELD

The present invention relates to a technique for developing an automatic driving control plan of a vehicle, and particularly relates to a technique for determining a preparation section for switching a vehicle traveling by automatic driving to manual driving.

BACKGROUND ART

There has been proposed an automatic driving support system that prompts a driver to switch to manual driving when the vehicle traveling by automatic driving approaches an end point of an automatic driving section (a section where automatic driving is planned). For example, Patent Document 1 below proposes an automatic driving support system that defines a section (hereinafter referred to as "driving switching preparation section") for switching from automatic driving to manual driving, by excluding a section where it is determined that a driving load applied to a driver in switching to manual driving is large.

PRIOR ART DOCUMENTS

Patent Documents

Patent Document 1: Japanese Patent Application Laid-Open No. 2015-157604

SUMMARY

Problem to be Solved by the Invention

As in the technique of Patent Document 1, if a section where a driving load on a driver is large is excluded from the driving switching preparation section, a burden on the driver in switching to manual driving can be reduced. However, there arises a problem that a substantial length of the driving switching preparation section is shortened correspondingly. In Patent Document 1, if the driving switching preparation section does not have a sufficient length, the above problem is solved by shifting the entire driving switching preparation section to a front side until a sufficient length can be secured.

However, if the driving switching preparation section is shifted to the front side, an end point of the driving switching preparation section, that is, an end point of the automatic driving section is also shifted to the front side, which shortens the automatic driving section. That is, the section where a burden on the driver can be reduced by performing automatic driving is shortened, which consequently leads to an increase of a burden on the driver.

The present invention has been made to solve the above-mentioned problem, and it is an object of the present invention to provide an automatic driving control planning apparatus capable of securing a sufficiently long driving switching preparation section while maintaining a length of the automatic driving section.

Means to Solve the Problem

An automatic driving control planning apparatus according to the present invention includes: an automatic driving control plan creator to create an automatic driving control plan including a plan of an automatic driving section that is a section where a subject vehicle is automatically driven, and a plan of a driving switching preparation section that is a section for switching the subject vehicle from automatic driving to manual driving at a final stage of the automatic driving section; a driving load calculator to predict, for each point of the driving switching preparation section, a driving load applied to a driver when the driver manually drives the subject vehicle; a driving switching permission determiner to extract, from the driving switching preparation section, a switching-inhibited section that is a section where switching from automatic driving to manual driving is not permitted, on the basis of the driving load at each point predicted by the driving load calculator; and a driving switching preparation section compensator to change a start point of the driving switching preparation section so as to lengthen the driving switching preparation section in accordance with a length of the switching-inhibited section when there is the switching-inhibited section in the driving switching preparation section.

Effects of the Invention

According to the present invention, when there is a switching-inhibited section in the driving switching preparation section, on the basis of the length thereof, a length of the driving switching preparation section is secured by changing a position of a start point of the driving switching preparation section. Further, unlike shifting the entire driving switching preparation section, the length of the automatic driving section is maintained.

Objects, features, aspects, and advantages of the present invention will become more apparent from the following detailed description and the accompanying drawings.

BRIEF DESCRIPTION OF DRAWINGS

FIG. 1 is a block diagram showing a configuration of a vehicle control system according to a first embodiment.

FIG. 2 is a view showing an example of a calculation method of a driving load.

FIG. 9 is a view showing an example of a calculation method of a length of a compensation section.

FIG. 10 is a view showing an example of the calculation method of a length of the compensation section.

FIG. 25 is a view showing an example of the switching propriety notification image.

FIG. 26 is a view showing an example of the switching propriety notification image.

FIG. 27 is a diagram showing an example of a hardware configuration of the automatic driving control planning apparatus.

DESCRIPTION OF EMBODIMENTS

First Embodiment

Figures 3, 4, 5:
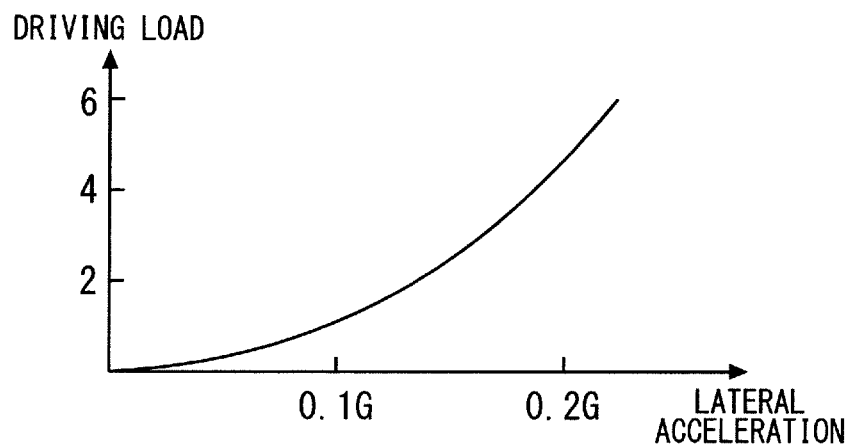
FIG. 3 is a view showing an example of the calculation method of a driving load.
FIG. 4 is a view showing an example of the calculation method of a driving load.
FIG. 5 is a view showing an example of the calculation method of a driving load.

FIG. 1 is a block diagram showing a configuration of a vehicle control system according to a first embodiment. As shown in FIG. 1, the vehicle control system includes a travel controller 1, a braking/driving mechanism 2, a steering mechanism 3, a manual driving apparatus 4, an automatic driving control planning apparatus 10, a position information acquisition apparatus 20, a map information storage 21, a notification processor 22, a peripheral information detector 30, and a notification apparatus 40. The peripheral information detector 30 is connected with a camera 31, a millimeter wave radar 32, an ultrasonic sensor 33, and a laser radar 34 of a vehicle mounted with the vehicle control system. Hereinafter, a vehicle mounted with the vehicle control system will be referred to as "subject vehicle", and a vehicle other than the subject vehicle will be referred to as "non-subject vehicle".

The travel controller 1 controls the braking/driving mechanism 2 and the steering mechanism 3 to control traveling of the subject vehicle. The braking/driving mechanism 2 is a mechanism to control a traveling speed of the subject vehicle and switch between forward movement and backward movement, and includes an accelerator, a brake, a shift, and the like, for example. The steering mechanism 3 is a mechanism to turn a traveling direction of the subject vehicle to the left and right, and includes a steering component or the like, for example.

The manual driving apparatus 4 is operation means to manually drive the subject vehicle, and includes, for example, a steering wheel, an accelerator pedal, a brake pedal, a shift lever, and the like.

The peripheral information detector 30 acquires, from the camera 31, the millimeter wave radar 32, the ultrasonic sensor 33, the laser radar 34, and the like mounted on the subject vehicle, information that is related to a peripheral situation of the subject vehicle and is required for automatic driving of the subject vehicle (hereinafter referred to as "peripheral information"). As the peripheral information acquired by the peripheral information detector 30, for example, a position of a lane of a road on which the subject vehicle is traveling, positions of a non-subject vehicle, a pedestrian and an obstacle that are present around the subject vehicle, a state of traffic lights, and the like are considered.

The automatic driving control planning apparatus 10 develops an automatic driving control plan of the subject vehicle on the basis of a planned traveling route of the subject vehicle. The automatic driving control plan developed by the automatic driving control planning apparatus 10 includes a plan of an "automatic driving section" that is a section where the subject vehicle is automatically driven on the planned traveling route, and a plan of a "driving switching preparation section" that is a section for switching the subject vehicle from automatic driving to manual driving at a final stage of the automatic driving section. Meanwhile, the planned traveling route of the subject vehicle is set by a navigation system (not shown) of the subject vehicle. The planned traveling route of the subject vehicle may be a route to a destination set by a user, or may be a route estimated from a travel history of the subject vehicle. Further, the navigation system to determine the planned traveling route of the subject vehicle may be mounted on the subject vehicle, or may be one using a navigation function of a mobile phone, a smartphone, or the like. For simplicity of explanation, in the present embodiment, it is assumed that the planned traveling route of the subject vehicle is set in advance.

When the driver has driving authority of the subject vehicle, the travel controller 1 performs manual driving of the subject vehicle by controlling the braking/driving mechanism 2 and the steering mechanism 3 in accordance with an operation of the manual driving apparatus 4 by the driver. On the other hand, when the travel controller 1 has the driving authority of the subject vehicle, the travel controller 1 performs automatic driving of the subject vehicle by controlling the braking/driving mechanism 2 and the steering mechanism 3 in accordance with the automatic driving control plan developed by the automatic driving control planning apparatus 10.

Further, when performing automatic driving of the subject vehicle, the travel controller 1 performs, on the braking/driving mechanism 2, for example, control for running the subject vehicle at a constant speed, control for keeping a constant distance between the subject vehicle and a non-subject vehicle, control for stopping before a pedestrian or an obstacle, and the like. Further, the travel controller 1 performs, on the steering mechanism 3, for example, control for preventing the subject vehicle from deviating from a lane in which the subject vehicle is traveling, control for allowing the subject vehicle to avoid a pedestrian, an obstacle, and the like. By combining the control on the braking/driving mechanism 2 and the steering mechanism 3, it is possible to run the subject vehicle to follow a non-subject vehicle (preceding vehicle) and to run along the planned traveling route.

Here, in the Japanese strategic innovation creation program (SIP) research and development plan of automated driving system (Cabinet Office, Jun. 23, 2016), the automated level (automatic driving level) of automatic driving of automobiles is defined as follows.

Level 1: A state where a system performs any one of acceleration, steering, and braking Level 2: A state where the system performs multiple operations among acceleration, steering, and braking Level 3: A state where the system performs all of acceleration, steering, and braking, and a driver handles when the system requests Level 4: All of acceleration, steering, and braking are performed by other than the driver, and the driver is not involved at all Note that the above "system" means a mechanism in which an automobile determines a road environment and the like from information obtained by an autonomous sensor, communication, and the like, and performs all or a part of acceleration, steering, and braking of the automobile. In the vehicle control system of FIG. 1, the travel controller 1 corresponds to the "system".

As can be seen from the definition of each level, driving authority of the automobile is on the system side at level 3 or higher, and on the driver side at level 2 or lower. In the present embodiment, "automatic driving" refers to automatic driving at level 3, "manual driving" refers to a state (level 0) in which the driver performs automatic driving of level 2 or lower and all of acceleration, steering, and braking. Further, in an embodiment, automatic driving control of level 4 is not discussed for simplicity of description.

As shown in FIG. 1, the position information acquisition apparatus 20, the map information storage 21, and the notification processor 22 are connected to the automatic driving control planning apparatus 10.

The position information acquisition apparatus 20 acquires information on a current position of the subject vehicle. Specifically, the position information acquisition apparatus 20 receives a positioning signal transmitted from, for example, a satellite of a global navigation satellite system (GNSS) such as a global positioning system (GPS), and calculates a current position of the subject vehicle from the positioning signal.

The map information storage 21 is a storage medium storing map information. The map information stored in the map information storage 21 is not only information of a road network, but various types of information to be used for automatic driving control are also stored (e.g., a speed limit of each road, clarity of a road marking, and the like). Here, it is assumed that the map information storage 21 is mounted on the subject vehicle, but the map information storage 21 may be configured as a server that provides map information to the automatic driving control planning apparatus 10 via wireless communication.

Next, details of the automatic driving control planning apparatus 10 will be described. As shown in FIG. 1, the automatic driving control planning apparatus 10 includes an automatic driving control plan creator 11, a driving load calculator 12, a driving switching permission determiner 13, and a driving switching preparation section compensator 14.

The automatic driving control plan creator 11 creates an automatic driving control plan of the subject vehicle on the basis of a planned traveling route of the subject vehicle and map information stored in the map information storage 21. As described above, the automatic driving control plan includes a plan of the automatic driving section that is a section where the subject vehicle is automatically driven, and a plan of the driving switching preparation section that is a section for switching the subject vehicle from automatic driving to manual driving at a final stage of the automatic driving section. For the automatic driving section, a section where automatic driving control is permitted in advance is allocated, such as expressways and highways, for example. For the driving switching preparation section, a last fixed length section of the automatic driving section is allocated. The length of the driving switching preparation section may be defined by a distance, or may be defined by a length of time required for traveling.

The driving load calculator 12 predicts, for each point of the driving switching preparation section, a driving load applied to a driver when the driver manually drives the subject vehicle. This driving load is calculated on the basis of a road shape or a road attribute at each point. FIGS. 2 to 4 show examples of a calculation method of a driving load.

FIG. 2 shows an example in which a driving load W1 at each point is calculated on the basis of a lateral acceleration g generated when the subject vehicle travels at that point. The lateral acceleration g is determined by a curvature of a road and a traveling speed of the subject vehicle, and takes a larger value as the curvature of the road and the traveling speed are larger. In the example of FIG. 2, the driving load W1 at a point where the lateral acceleration g is predicted to be less than 0.07 G is defined to be 0 points, the driving load W1 at a point where the lateral acceleration g is predicted to be 0.07 G or more and less than 0.1 G is defined to be 1 point, the driving load W1 at a point where the lateral acceleration g is predicted to be 0.1 G or more and less than 0.2 G is defined to be 3 points, and the driving load W1 at a point where the lateral acceleration g is predicted to be 0.2 G or more is defined to be 5 points. Here, the driving load W1 at each point is evaluated by the lateral acceleration g, but may be evaluated only by a curvature of a road at that point without considering the traveling speed of the subject vehicle.

FIG. 3 shows an example in which a driving load W2 at each point is calculated on the basis of poor visibility of the point. A visible distance d can be calculated from a road shape, a position of a building, and the like. In the example of FIG. 3, the driving load W2 at a point where the visible distance d is 100 m or more is defined to be 0 points, the driving load W2 at a point where the visible distance is 50 m or more and less than 100 m is defined to be 2 points, and the driving load W2 at a point where the visible distance d is less than 50 m is defined to be 3 points.

FIG. 4 shows an example in which a driving load W3 at each point is calculated on the basis of a road attribute at that point. In the example of FIG. 4, the driving load W3 at an intersection is defined to be 5 points, the driving load at both a branch point and a junction of a road is defined to be 3 points, and the driving load at other points (points where there is no branch, merge, or the like) is defined to be 0 points.

The driving load at each point may be calculated on the basis of a plurality of items. For example, the driving load at each point may be a total of the driving load W1 calculated from the lateral acceleration g, the driving load W2 calculated from poor visibility (the visible distance d), and the driving load W3 calculated from a road attribute.

In addition, while FIGS. 2 to 4 show the examples in which the driving loads W1, W2, and W3 take discrete values (points), but the driving load may take a continuous value. For example, a graph of FIG. 5 shows an example in which the driving load is set to take a continuous value that increases in a quadratic curve shape with respect to magnitude of a lateral acceleration.

Returning to FIG. 1, the driving switching permission determiner 13 of the automatic driving control planning apparatus 10 extracts, on the basis of the driving load at each point predicted by the driving load calculator 12, a "switching-inhibited section" that is a section where switching from automatic driving to manual driving is not permitted, from the driving switching preparation section. Specifically, the driving switching permission determiner 13 extracts a section that is predicted to have a high driving load, as the switching-inhibited section. Hereinafter, a portion of the driving switching preparation section other than the switching-inhibited section may be referred to as a "switching-permitted section".

As a method of extracting the switching-inhibited section, for example, a method in which a section including a point where the driving load exceeds a predetermined threshold value is set as the switching-inhibited section is conceivable. For example, it is considerable to set, as the switching-inhibited section, a section of 30 m before and after a point where a total of the driving load W1 calculated from the lateral acceleration g as shown in FIG. 2, the driving load W2 calculated from poor visibility (the visible distance d) as shown in FIG. 3, and the driving load W3 calculated from a road attribute as shown in FIG. 4 exceeds 3 points.

Alternatively, the driving switching preparation section may be divided into a plurality of sections in advance, the driving load at each section may be defined as a maximum value of the driving load of the point belonging to that section, and a section where the driving load exceeds a threshold value may be set as the switching-inhibited section. For example, it is considerable to section the driving switching preparation section at 50 m intervals, and set, as the switching-inhibited section, a section including a point where a total of the driving load W1 calculated from the lateral acceleration g as shown in FIG. 2, the driving load W2 calculated from poor visibility (the visible distance d) as shown in FIG. 3, and the driving load W3 calculated from a road attribute as shown in FIG. 4 exceeds 3 points.

Returning to FIG. 1 again, the driving switching preparation section compensator 14 of the automatic driving control planning apparatus 10 changes a start point of the driving switching preparation section so as to lengthen the driving switching preparation section in accordance with a length of the switching-inhibited section when there is the switching-inhibited section in the driving switching preparation section.

Figure 6:
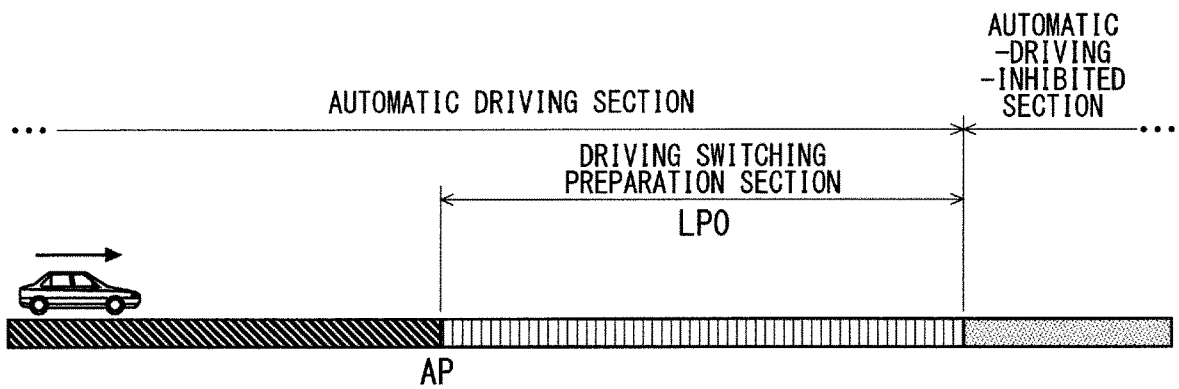
FIG. 6 is a view for explaining an operation of a driving switching preparation section compensator.
Figure 7:
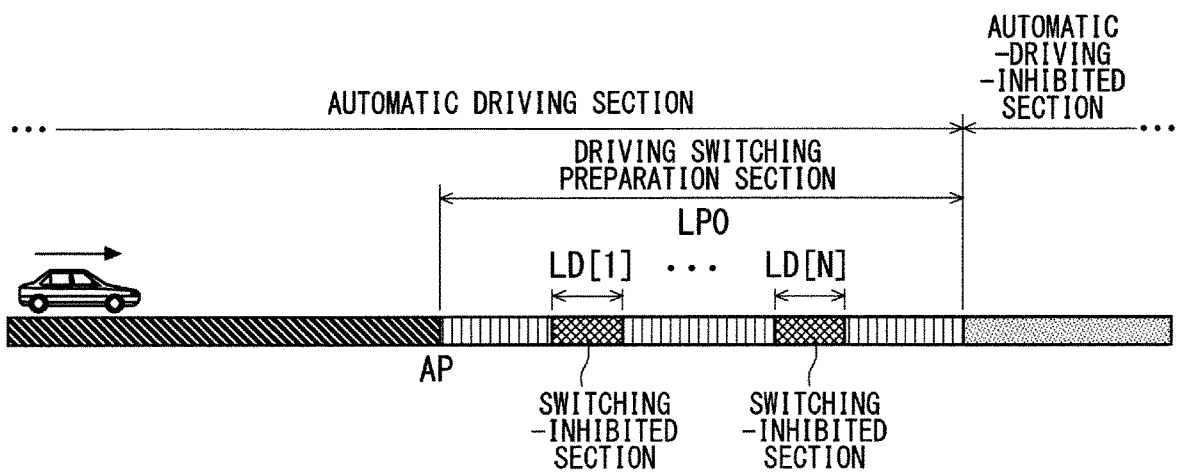
FIG. 7 is a view for explaining an operation of the driving switching preparation section compensator.
Figure 8:
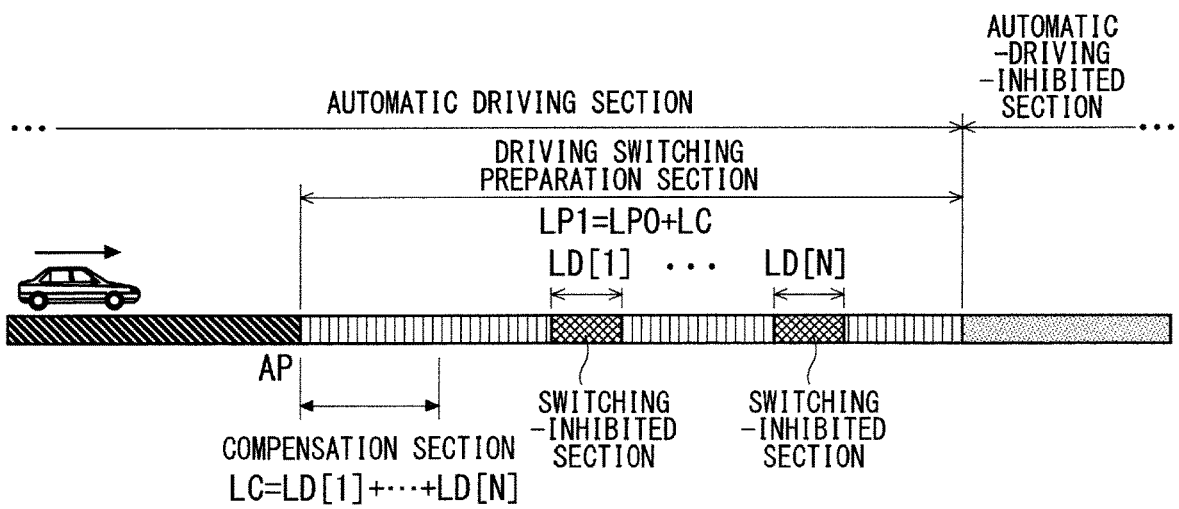
FIG. 8 is a view for explaining an operation of the driving switching preparation section compensator.

FIGS. 6 to 8 are views schematically showing an operation of this driving switching preparation section compensator 14. For example, it is assumed that the automatic driving control plan creator 11 has created an automatic driving control plan provided with the driving switching preparation section of a length LP0 at the end of the automatic driving section as shown in FIG. 6 (a reference sign "AP" indicates a start point of the driving switching preparation section). Further, it is assumed that the driving switching permission determiner 13 extracts N pieces of switching-inhibited section in the driving switching preparation section as shown in FIG. 7. Since switching from automatic driving to manual driving is not permitted in the switching-inhibited section, a substantial length of the driving switching preparation section is shortened by a total of lengths of the N pieces of switching-inhibited section. In this case, as shown in FIG. 8, the driving switching preparation section compensator 14 lengthens the driving switching preparation section by moving a position of the start point AP of the driving switching preparation section to a front side (a side closer to the subject vehicle). This compensates a length of the driving switching preparation section that has been substantially shortened by the presence of the switching-inhibited section.

Even if there is the switching-inhibited section in the driving switching preparation section, the process of the driving switching preparation section compensator 14 allows a substantial length of the driving switching preparation section to be sufficiently secured. In addition, since the driving switching preparation section compensator 14 does not move a position of an end point of the driving switching preparation section (that is, an end point of the automatic driving section), the length of the automatic driving section is maintained.

Here, a portion extended by the driving switching preparation section compensator 14 in order to compensate the length of the driving switching preparation section, that is, a section between a position of the start point AP of the driving switching preparation section before compensation and a position of the start point AP of the driving switching preparation section after compensation is referred to as a "compensation section". When a length of the compensation section is LC, a length LP1 of the driving switching preparation section after compensation is expressed as LP1=LP0+LC.

FIG. 8 shows an example in which the length LC of the compensation section is made equal to the length of the switching-inhibited section (or a total length if there are a plurality of switching-inhibited sections). That is, when a length of each of the N pieces of switching-inhibited section is LD [x], the length LC of the compensation section is expressed as LC=LD [1]+ . . . +LD [N]. In this case, a relationship between a length of a switching-permitted section (a part other than the switching-inhibited section in the driving switching preparation section) and the length of the compensation section is as shown in a graph of FIG. 9. According to this method, the substantial length of the driving switching preparation section can be made equivalent to that in a case where there is no switching-inhibited section.

However, since the driving switching preparation section compensator 14 determines the driving switching preparation section with a length that is more than sufficient with a margin, it is considered that there is no problem even if the substantial length of the driving switching preparation section becomes short to an extent.

Therefore, when the length of the switching-inhibited section is shorter than a predetermined threshold value, or when the length of the driving switching preparation section excluding the switching-inhibited section is longer than a predetermined threshold value, it is not necessary to lengthen the driving switching preparation section. For example, when the length of the switching-inhibited section is 20% or less of the length of the driving switching preparation section, the driving switching preparation section may not be lengthened. In this case, a relationship between the length of the switching-permitted section and the length of the compensation section is represented by a graph of FIG. 10.

Figure 11:
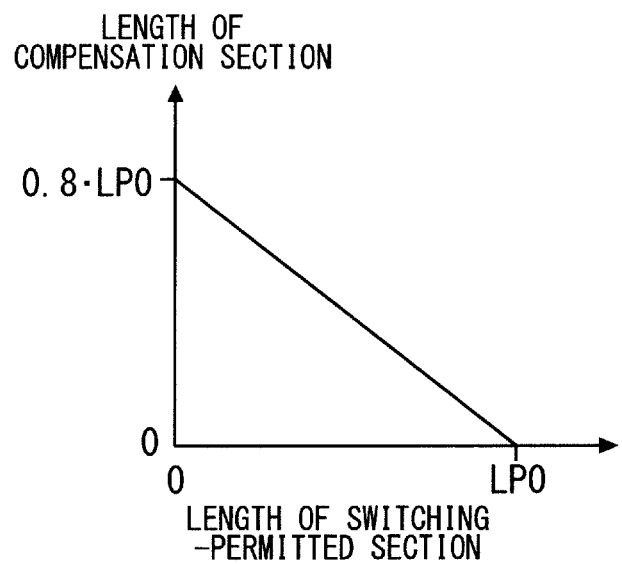
FIG. 11 is a view showing an example of the calculation method of a length of the compensation section.

Further, for a similar reason, an amount to be lengthened in the driving switching preparation section by the driving switching preparation section compensator 14 (that is, the length of the compensation section) may be made shorter than the length of the switching-inhibited section. For example, the length of the compensation section may be 80% of the length of the switching-inhibited section. In this case, a relationship between the length of the switching-permitted section and the length of the compensation section is represented by a graph of FIG. 11.

Returning to FIG. 1 again, the automatic driving control plan creator 11 of the automatic driving control planning apparatus 10 sends, to the notification processor 22, the automatic driving control plan after the driving switching preparation section is compensated by the driving switching preparation section compensator 14.

The notification processor 22 controls the notification apparatus 40 that presents information to the driver of the subject vehicle, on the basis of an automatic driving control plan acquired from the automatic driving control planning apparatus 10, a current position of the subject vehicle acquired by the position information acquisition apparatus 20, and map information stored in the map information storage 21. This allows the notification processor 22 to notify the driver of various kinds of information.

For example, when the subject vehicle enters the driving switching preparation section, the notification processor 22 notifies the driver of the fact, by using the notification apparatus 40. Further, after the subject vehicle enters the driving switching preparation section, the notification processor 22 uses the notification apparatus 40 to notify the driver whether or not the subject vehicle is located within the switching-inhibited section. A specific example of the notification performed by the notification processor 22 will be described later.

Figure 12:
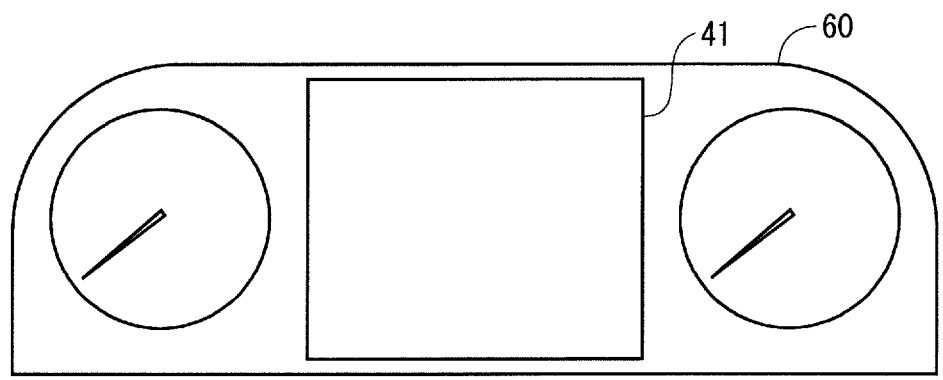
FIG. 12 is a view showing an arrangement example of a display of a notification apparatus.

In the present embodiment, the notification apparatus 40 includes a display 41 that outputs information as an image, and a sound output unit 42 that outputs information as sound. A position where the display 41 is installed may be any position within the subject vehicle as long as it is a position where the driver can easily recognize the display 41 visually. For example, as shown in FIG. 12, it is conceivable to arrange the display 41 in an instrument panel 60 of the driver's seat of the subject vehicle.

The display 41 of the notification apparatus 40 may be a screen of a car navigation system mounted on the subject vehicle. Further, the sound output unit 42 may be a speaker of an audio system mounted on the subject vehicle. Furthermore, the notification apparatus 40 may be realized by using other apparatus having display means and sound output means, such as a mobile phone or a smartphone.

FIG. 1 shows the notification processor 22 as a separate apparatus from the automatic driving control planning apparatus 10, but the notification processor 22 may be incorporated in the automatic driving control planning apparatus 10. That is, the automatic driving control planning apparatus 10 and the notification processor 22 may be configured integrally.

Figure 13:
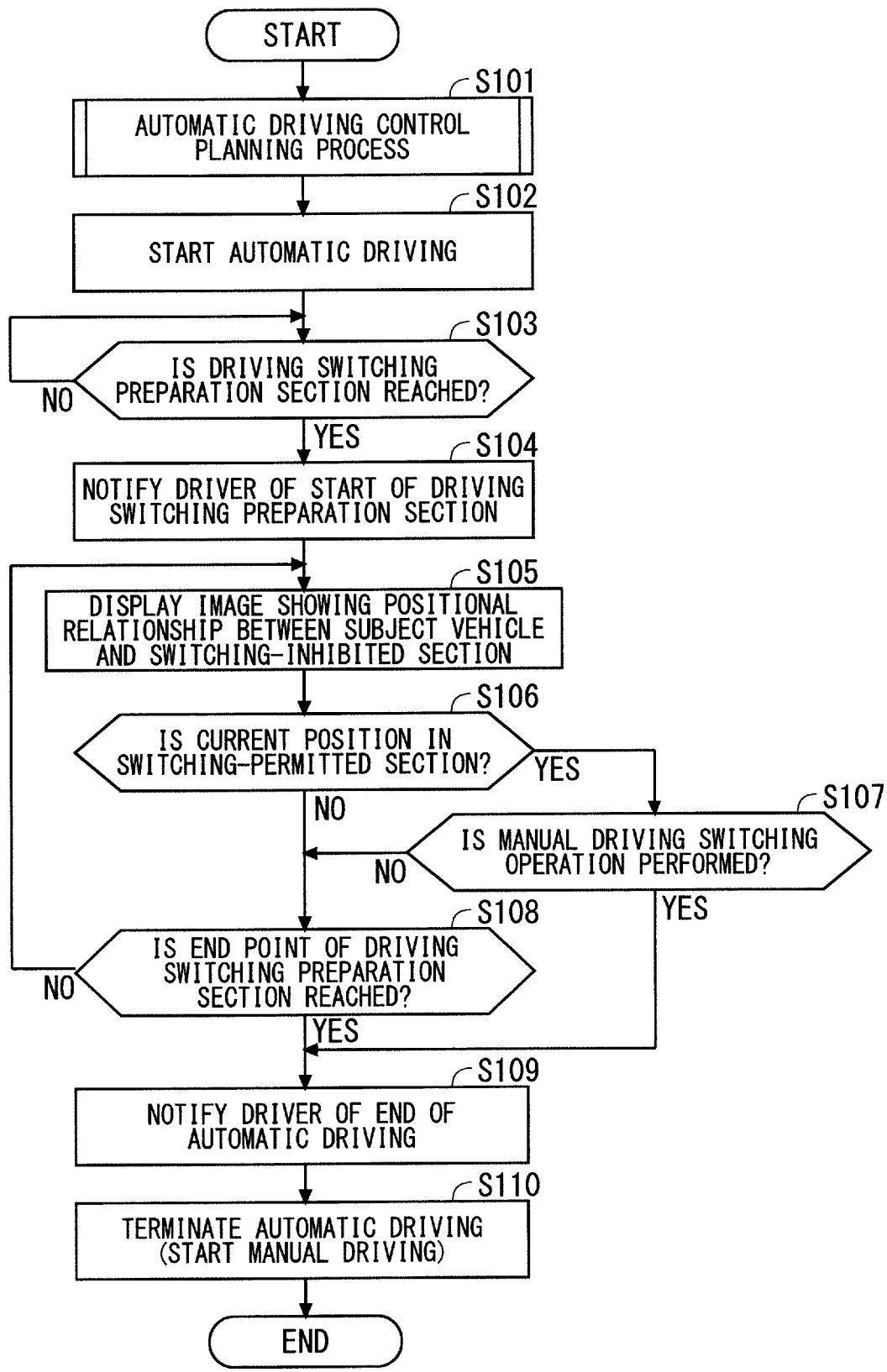
FIG. 13 is a flowchart showing an operation of the vehicle control system.
Figure 14:
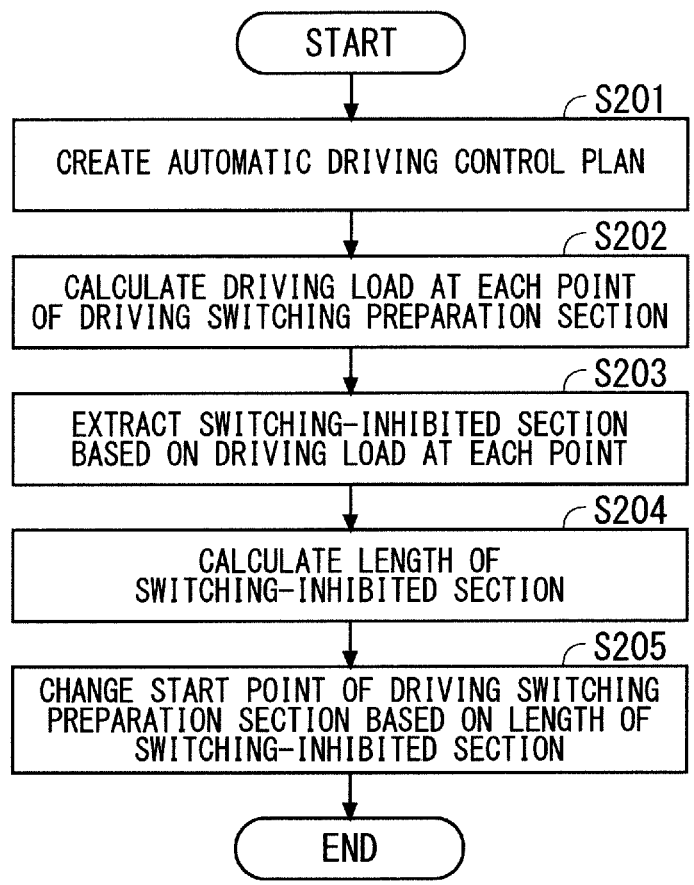
FIG. 14 is a flowchart showing an automatic driving control planning process performed by an automatic driving control planning apparatus.

FIG. 13 is a flowchart showing an operation of the vehicle control system according to the first embodiment. Further, FIG. 14 is a flowchart showing an "automatic driving control planning process" (step S101) in the flow of FIG. 13. Hereinafter, an operation of the vehicle control system according to the first embodiment will be described with reference to FIGS. 13 and 14. Note that the flow of FIG. 13 is executed when automatic driving of the subject vehicle is performed.

When the driver performs an operation for performing automatic driving of the subject vehicle, the automatic driving control planning apparatus 10 executes the "automatic driving control planning process" that is a process for developing an automatic driving control plan (step S101).

In the automatic driving control planning process, the flow shown in FIG. 14 is executed in the automatic driving control planning apparatus 10. First, the automatic driving control plan creator 11 creates an automatic driving control plan on the basis of a planned traveling route of the subject vehicle and map information acquired from the map information storage 21 (step S201). The automatic driving control plan includes a plan of the automatic driving section and a plan of the driving switching preparation section.

Next, the driving load calculator 12 calculates a driving load in a case where the driver performs manual driving of the subject vehicle, for each point of the driving switching preparation section planned in step S201 (step S202). Subsequently, the driving switching permission determiner 13 extracts a section with a high driving load as the switching-inhibited section on the basis of a driving load at each point calculated in step S202 (step S203). Furthermore, the driving switching permission determiner 13 calculates a length of the extracted switching-inhibited section (step S204). When there are a plurality of switching-inhibited sections, a total of these lengths is calculated in step S204.

Then, as shown in FIGS. 7 and 8, on the basis of the length of the switching-inhibited section calculated in step S204, the driving switching preparation section compensator 14 changes a start point of the driving switching preparation section to lengthen the driving switching preparation section (step S205).

Even if there is the switching-inhibited section in the driving switching preparation section, a sufficient length is secured in the driving switching preparation section by performing the automatic driving control planning process of FIG. 14. Note that, when no switching-inhibited section is extracted in step S203, the length of the switching-inhibited section becomes 0, so that step S204 and step S205 may be skipped.

Returning to FIG. 13, when the automatic driving control planning process of step S101 is completed, the travel controller 1 starts automatic driving of the subject vehicle (step S102). That is, driving authority of the subject vehicle is shifted from the driver to the travel controller 1, and the travel controller 1 performs automatic control of the braking/driving mechanism 2 and the steering mechanism 3, on the basis of an automatic driving control plan developed in step S101 and the peripheral information acquired by the peripheral information detector 30.

While automatic driving of the subject vehicle is being performed, the notification processor 22 checks whether or not the subject vehicle has reached the driving switching preparation section (step S103), on the basis of a current position of the subject vehicle acquired by the position information acquisition apparatus 20 and map information stored in the map information storage 21. The notification processor 22 waits until the subject vehicle reaches the driving switching preparation section (NO in step S103).

When the subject vehicle reaches the driving switching preparation section (YES in step S103), the notification processor 22 uses the notification apparatus 40 to notify the driver of a start of the driving switching preparation section (step S104). As a specific example of the notification in step S104, for example, it is conceivable that the notification processor 22 causes the sound output unit 42 of the notification apparatus 40 to output a voice message "Entered the driving switching preparation section" at a timing when the subject vehicle enters the driving switching preparation section.

The notification of step S104 may be performed before the timing of entering the driving switching preparation section. For example, at a timing one minute before the subject vehicle enters the driving switching preparation section, the notification processor 22 may cause the sound output unit 42 of the notification apparatus 40 to output a voice message "Entering the driving switching preparation section in one minute".

After the subject vehicle reaches the driving switching preparation section, the notification processor 22 causes the display 41 of the notification apparatus 40 to display an image showing a positional relationship between the subject vehicle and the switching-inhibited section (step S105). By displaying this image on the display 41, the notification processor 22 notifies the driver of information as to whether or not the subject vehicle is located in the switching-inhibited section, that is, information as to whether or not the subject vehicle can be switched to manual driving. Hereinafter, the image showing the positional relationship between the subject vehicle and the switching-inhibited section is referred to as "switching propriety notification image".

Figure 15:
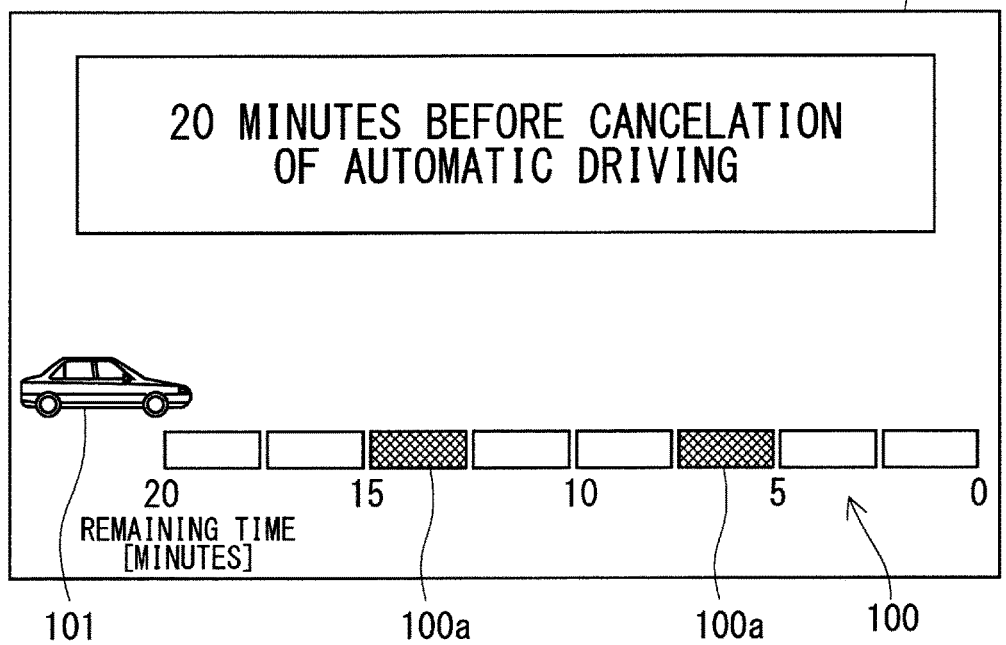
FIG. 15 is a view showing an example of a switching propriety notification image.
Figure 16:
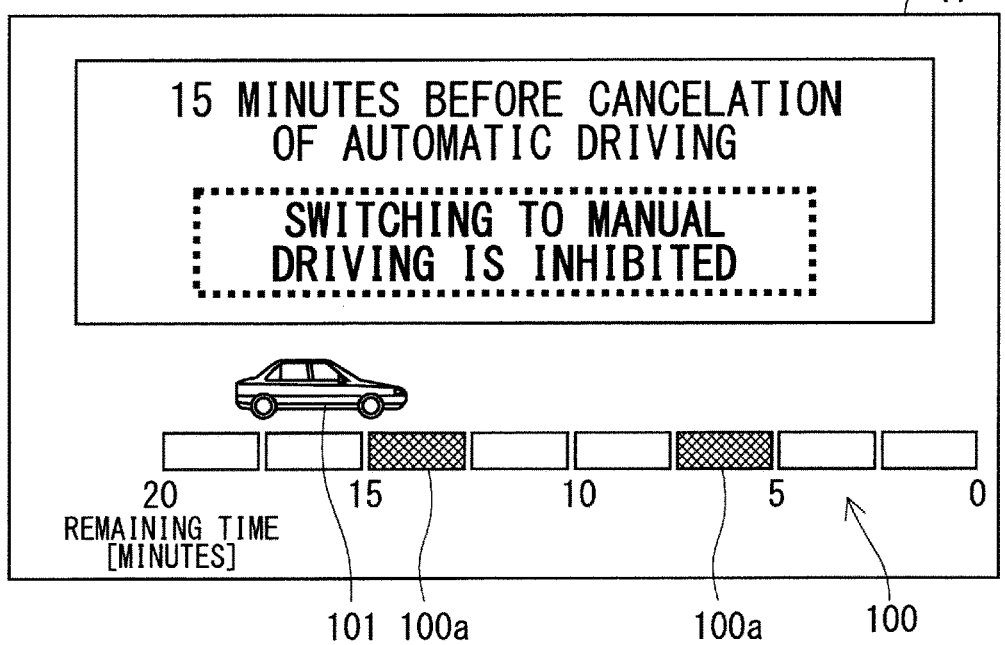
FIG. 16 is a view showing an example of the switching propriety notification image.

FIGS. 15 and 16 are views showing examples of the switching propriety notification image. For example, in a case where a start point of the driving switching preparation section is defined as a point 20 minutes before reaching an end point of the automatic driving section, when the subject vehicle enters the driving switching preparation section, the notification processor 22 causes the display 41 of the notification apparatus 40 to display the switching propriety notification image as shown in FIG. 15. The switching propriety notification image in FIG. 15 is an image obtained by synthesizing a subject vehicle position mark 101 that is an image showing a position of the subject vehicle, on a section display bar 100 that is an image linearly expressing the driving switching preparation section including the switching-inhibited section. The section display bar 100 includes a switching-inhibited section mark 100a indicating a position corresponding to the switching-inhibited section. In addition, the switching propriety notification image in FIG. 15 also shows a remaining time until the automatic driving is canceled (remaining time until the subject vehicle reaches the end point of the driving switching preparation section).

When the subject vehicle travels from the state of FIG. 15, the notification processor 22 changes a display position of the subject vehicle position mark 101 in the switching propriety notification image in accordance with a change in the position of the subject vehicle. When the subject vehicle enters the switching-inhibited section, the notification processor 22 adds a character message "Switching to manual driving is inhibited" to the switching propriety notification image, as shown in FIG. 16.

In addition, the notification processor 22 may use the sound output unit 42 of the notification apparatus 40 to notify the driver of information as to whether or not the subject vehicle is located in the switching-inhibited section. For example, it is preferable to cause the sound output unit 42 to output a voice message "Switching to manual driving has been inhibited" at a timing when the subject vehicle enters the switching-inhibited section, and causes the sound output unit 42 to output a voice message "Switching to manual driving has become possible" at a timing of exiting from the switching-inhibited section.

Returning to FIG. 13, while performing automatic driving of the subject vehicle, the travel controller 1 checks whether or not a current position of the subject vehicle is in the switching permitted section (step S106). When the current position of the subject vehicle is in the switching-permitted section (YES in step S106), the travel controller 1 checks whether or not the driver has performed an operation for switching the subject vehicle to manual driving (hereinafter referred to as a "manual driving switching operation") (step S107). As the manual driving switching operation, for example, an override operation using the manual driving apparatus 4 or the like is conceivable. However, the manual driving switching operation may be any as long as the driver can transmit the intention of switching the subject vehicle to the manual driving to the travel controller 1, and may be performed by using an operation input apparatus (not shown) other than the manual driving apparatus 4.

If the manual driving switching operation is performed while the subject vehicle is traveling in the switching-permitted section (YES in step S107), the notification processor 22 uses the notification apparatus 40 to notify the driver of the end of the automatic driving (step S109), and the travel controller 1 terminates automatic driving (step S110). As a result, driving authority of the subject vehicle is shifted from the travel controller 1 to the driver, and the driver uses the manual driving apparatus 4 to perform manual driving of the subject vehicle.

Figures 17, 18:
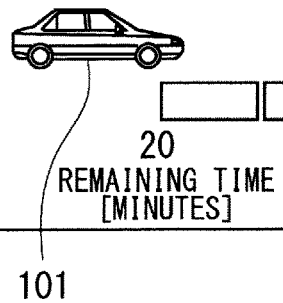
FIG. 17 is a view showing an example of an image displayed on the display of the notification apparatus at the end of automatic driving.
FIG. 18 is a view showing an example of the switching propriety notification image.

The notification in step S109 may be a voice message such as "Automatic driving is to be terminated and switched to manual driving", or as shown in FIG. 17, a character message "Automatic driving is to be terminated and switched to manual driving" may be displayed on the display 41.

When the subject vehicle is traveling in the switching-inhibited section (NO in step S106), and when the manual driving switching operation is not performed even while the subject vehicle is traveling in the switching-permitted section (NO in step S107), the travel controller 1 checks whether or not an end point of the driving switching preparation section has been reached (step S108).

When the subject vehicle has not reached the end point of the driving switching preparation section (NO in step S108), processing returns to step S105 and automatic driving of the subject vehicle is continued. When the subject vehicle has reached the end point of the driving switching preparation section (YES in step S108), the notification processor 22 uses the notification apparatus 40 to notify the driver of the end of the automatic driving (step S109), and the travel controller 1 terminates automatic driving (step S110). As a result, driving authority of the subject vehicle is shifted from the travel controller 1 to the driver, and the driver uses the manual driving apparatus 4 to perform manual driving of the subject vehicle.

In the above description, an example is shown in which manual driving is started in step S110 when it is determined as YES in step S108, that is, even when the subject vehicle has reached the end point of the driving switching preparation section without performing the manual driving switching operation. However, in a case where the subject vehicle has reached the end point of the driving switching preparation section without performing the manual driving switching operation, it may be considered that the driver is not ready for manual driving. Therefore, in that case, the travel controller 1 may move and stop the subject vehicle at a place where the subject vehicle can be stopped, such as a shoulder of the road, by automatic driving.

Here, some modifications of the switching propriety notification image shown in FIGS. 15 and 16 are shown. FIGS. 15 and 16 show examples in which, on the screen of the display 41, a display position of the section display bar 100 is fixed at a fixed position while the display position of the subject vehicle position mark 101 is moved in accordance with a change in a current position of the subject vehicle.

Figure 19:
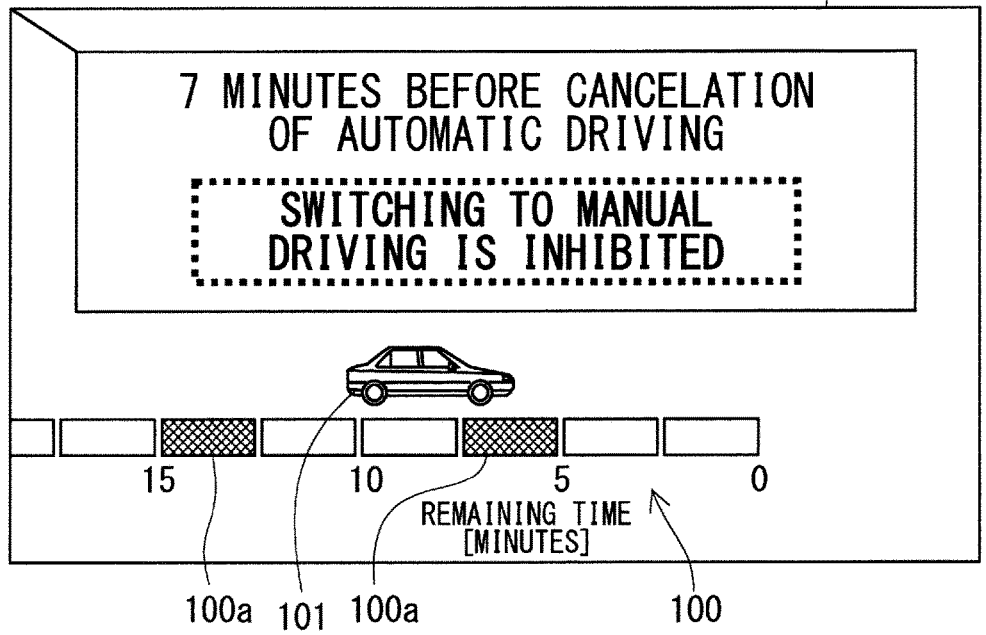
FIG. 19 is a view showing an example of the switching propriety notification image.

However, as shown in FIGS. 18 and 19, the display position of the subject vehicle position mark 101 may be fixed at a fixed position while the section display bar 100 may be scrolled in accordance with a change of the current position of the subject vehicle.

Figure 20:
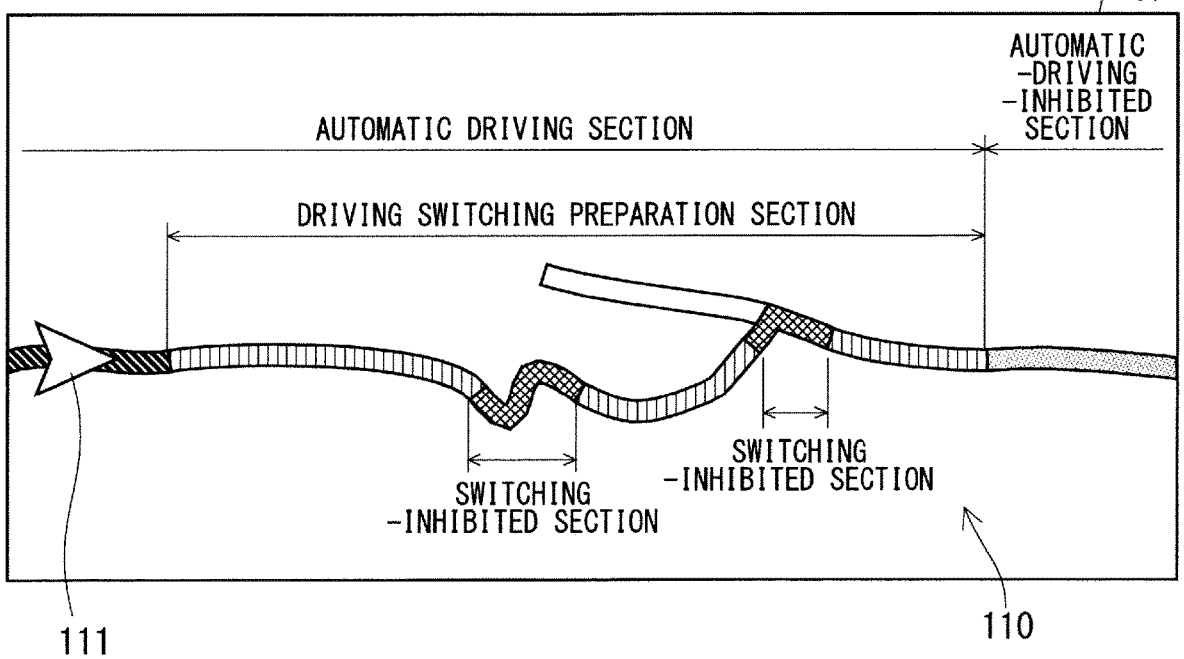
FIG. 20 is a view showing an example of the switching propriety notification image.

Further, as shown in FIG. 20, the switching propriety notification image to be displayed on the display 41 may be an image 110 of a map (hereinafter referred to as "map image 110") showing a position of the subject vehicle and a position of the switching-inhibited section. In the map image 110 of FIG. 20, the position of the subject vehicle is indicated by the subject vehicle position mark 111. Further, in the map image 110, the automatic driving section, the switching-permitted section and the switching-inhibited section of the driving switching preparation section, and an automatic-driving-inhibited section are displayed in different colors, thereby indicating the position of the automatic driving section.

Figure 21:
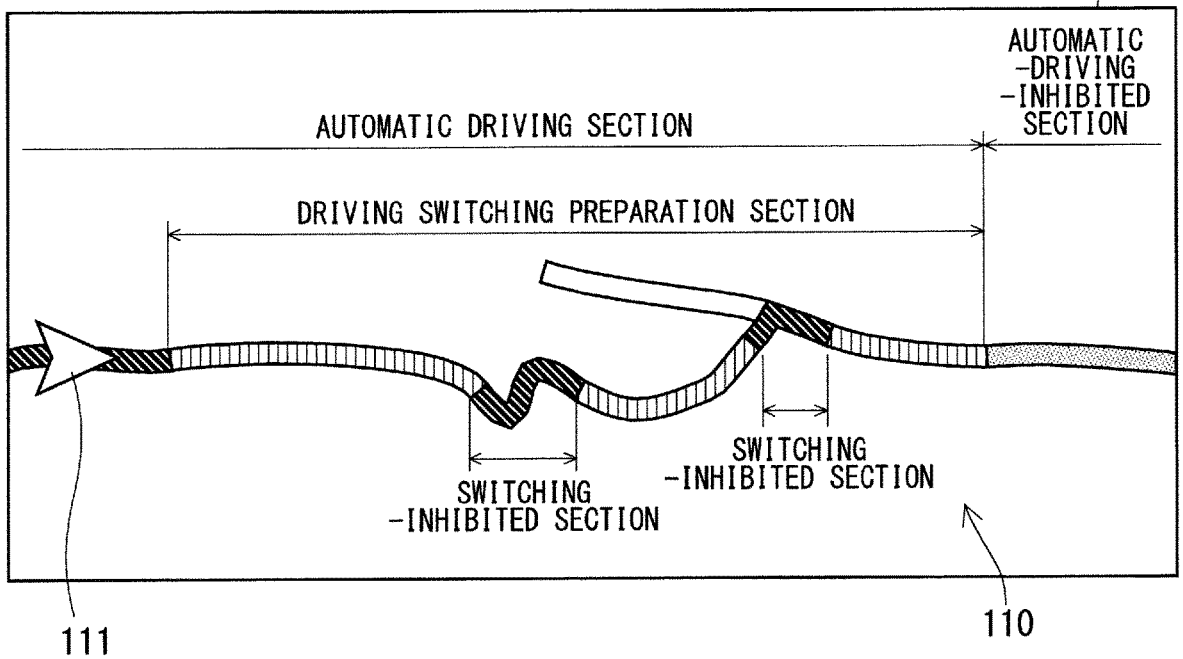
FIG. 21 is a view showing an example of the switching propriety notification image.
Figure 22:
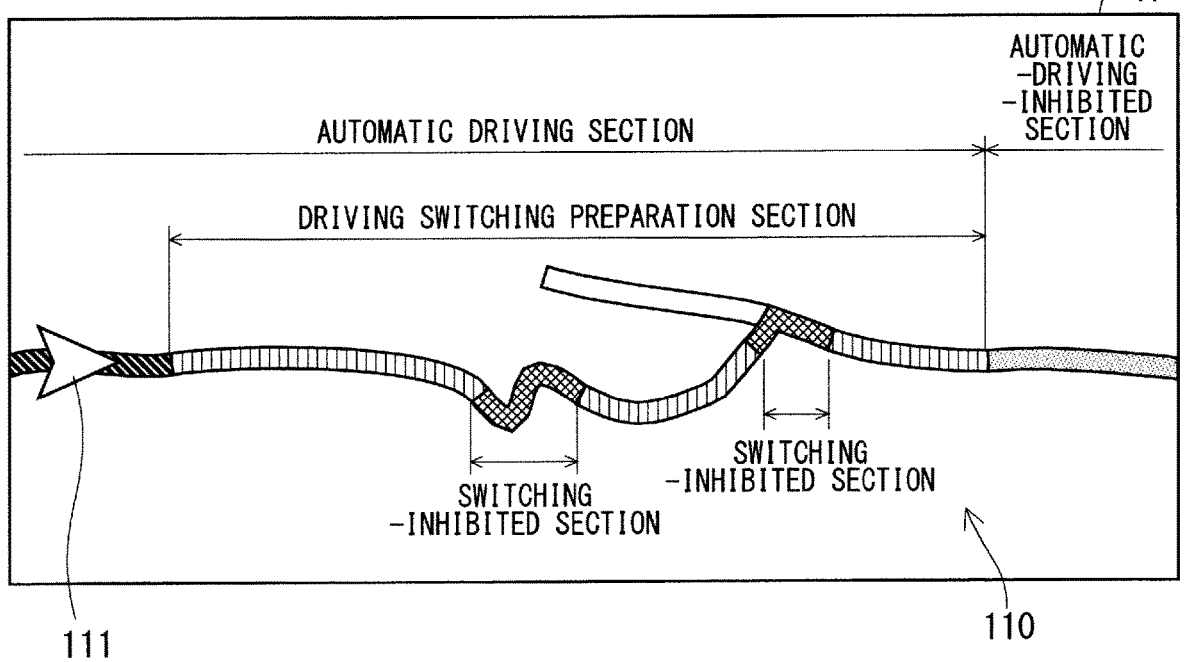
FIG. 22 is a view showing an example of the switching propriety notification image.
Figure 23:
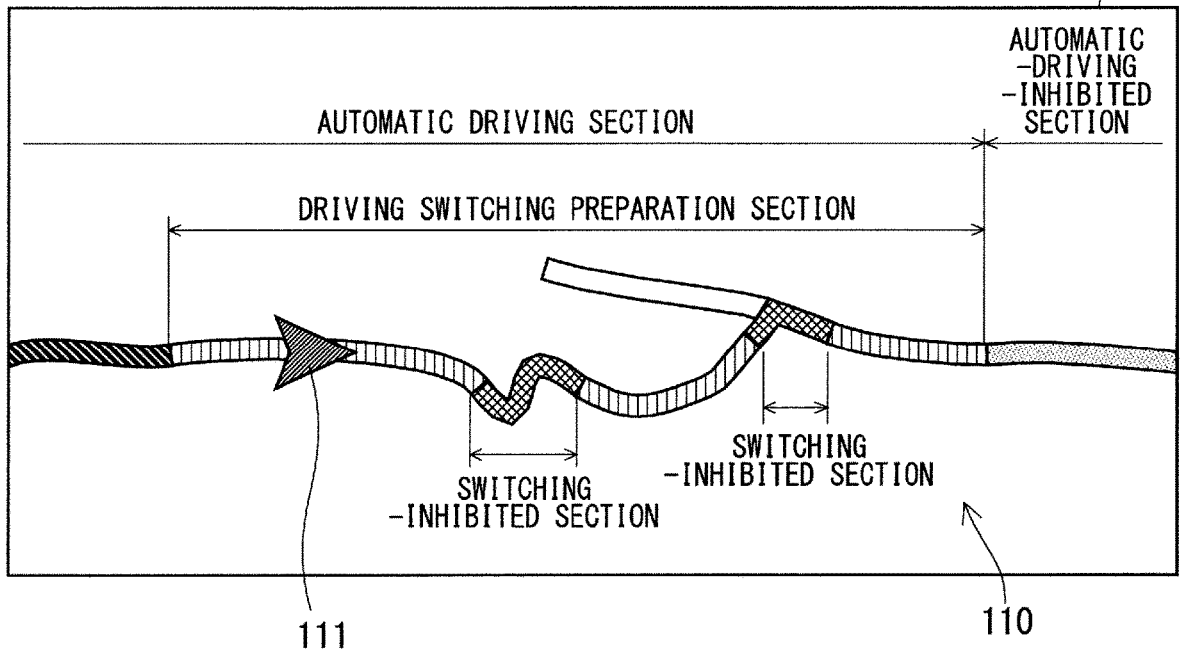
FIG. 23 is a view showing an example of the switching propriety notification image.
Figure 24:
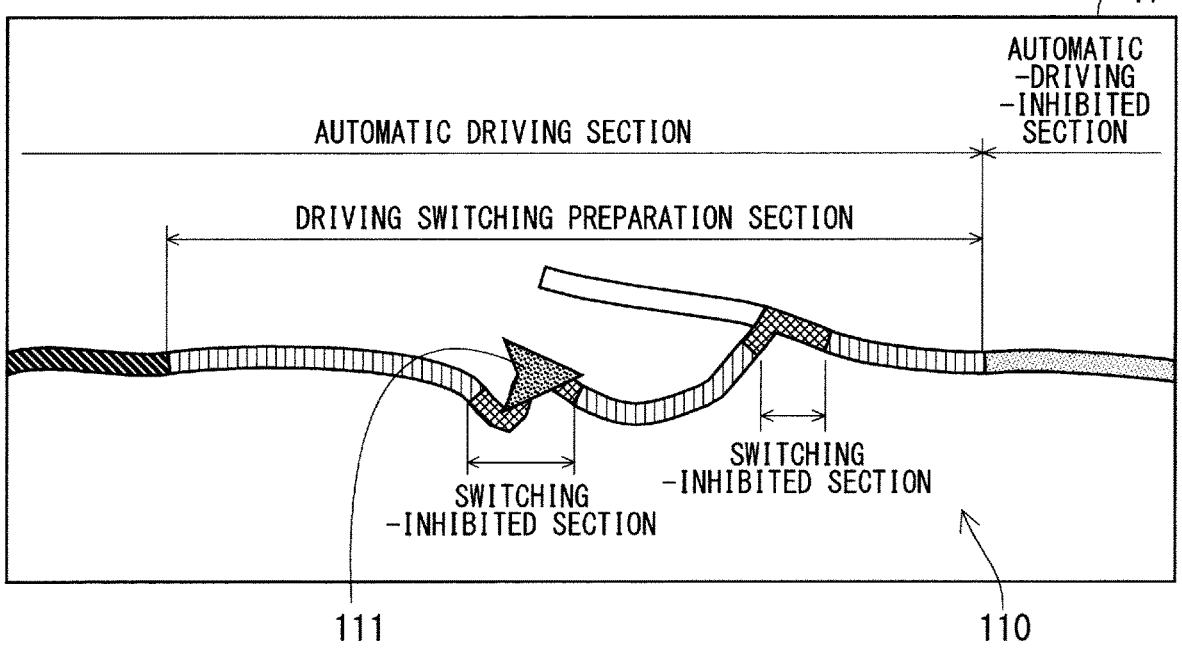
FIG. 24 is a view showing an example of the switching propriety notification image.

The map image 110 of FIG. 20 shows an example in which the automatic driving section, the switching-permitted section, the switching-inhibited section, and the automatic-driving-inhibited section are all displayed in different colors. However, the switching-inhibited section is the same as the normal automatic driving section (the section excluding the switching-inhibited section in the automatic driving section) in that it is not permitted to switch from automatic driving to manual driving, so that the color of the switching-inhibited section may be the same color as the normal automatic driving section, as shown in FIG. 21.

Further, as shown in FIGS. 22 to 25, the color of the subject vehicle position mark 111 may be changed when the subject vehicle is: located in the automatic driving section; located in the switching-permitted section; located in the switching-inhibited section; and located in the automatic-driving-inhibited section. FIGS. 22 to 25 show examples in which, on the screen of the display 41, a display position of the map image 110 is fixed at a fixed position while a display position of the subject vehicle position mark 111 is moved in accordance with a change in a current position of the subject vehicle. However, as shown in FIG. 26, the display position of the subject vehicle position mark 111 may be fixed at a fixed position while the map image 110 may be scrolled in accordance with a change of the current position of the subject vehicle.

Figure 28:
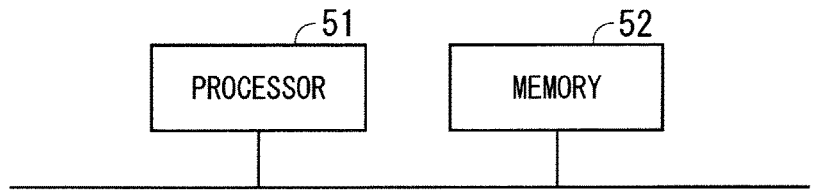
FIG. 28 is a diagram showing an example of a hardware configuration of the automatic driving control planning apparatus.

FIGS. 27 and 28 each are diagrams showing examples of a hardware configuration of the automatic driving control planning apparatus 10. Each element of the automatic driving control planning apparatus 10 shown in FIG. 1 (the automatic driving control plan creator 11, the driving load calculator 12, the driving switching permission determiner 13, and the driving switching preparation section compensator 14) is realized, for example, by a processing circuit 50 shown in FIG. 27. That is, the processing circuit 50 includes: the automatic driving control plan creator 11 that creates an automatic driving control plan including a plan of the automatic driving section and a plan of the driving switching preparation section; the driving load calculator 12 that predicts, for each point of the driving switching preparation section, a driving load applied to a driver when the driver manually drives the subject vehicle; the driving switching permission determiner 13 that extracts the switching-inhibited section from the driving switching preparation section on the basis of the driving load at each point predicted by the driving load calculator 12; and the driving switching preparation section compensator 14 that changes a start point of the driving switching preparation section so as to lengthen the driving switching preparation section in accordance with a length of the switching-inhibited section. To the processing circuit 50, dedicated hardware may be applied, or a processor (central processing unit (CPU), a central processing device, a processing device, an arithmetic unit, a microprocessor, a microcomputer, or a digital signal processor (DSP)) that executes a program stored in a memory may be applied.

In a case where the processing circuit 50 is dedicated hardware, the processing circuit 50 corresponds to, for example, a single circuit, a composite circuit, a programmed processor, a parallel-programmed processor, an application specific integrated circuit (ASIC), a field-programmable gate array (FPGA), or a combination thereof. Each function of each element of the automatic driving control planning apparatus 10 may be realized by a plurality of processing circuits, or these functions may be collectively realized by one processing circuit.

FIG. 28 shows a hardware configuration of the automatic driving control planning apparatus 10 in a case where the processing circuit 50 is configured using a processor 51. In this case, the function of each element of the automatic driving control planning apparatus 10 is realized by a combination with software or the like (software, firmware, or software and firmware). The software or the like is described as a program and stored in a memory 52. The processor 51 as the processing circuit 50 reads out and executes the program stored in the memory 52, thereby realizing the function of each part. That is, the automatic driving control planning apparatus 10 includes the memory 52 to store a program that consequently causes, when executed by the processing circuit 50, execution of: a process of creating an automatic driving control plan including a plan of the automatic driving section and a plan of a driving switching preparation section; a process of predicting, for each point of the driving switching preparation section, a driving load applied to a driver when the driver manually drives the subject vehicle; a process of extracting the switching-inhibited section from the driving switching preparation section on the basis of the driving load at each point predicted by the driving load calculator 12; and a process of changing a start point of the driving switching preparation section so as to lengthen the driving switching preparation section in accordance with a length of the switching-inhibited section. In other words, this program can also be said to cause a computer to execute a procedure and a method of an operation of each element of the automatic driving control planning apparatus 10.

Here, the memory 52 may be, for example, a non-volatile or volatile semiconductor memory such as a random access memory (RAM), a read only memory (ROM), a flash memory, an erasable programmable read only memory (EPROM), or an electrically erasable programmable read only memory (EEPROM), a hard disk drive (HDD), a magnetic disk, a flexible disk, an optical disk, a compact disk, a mini disk, a digital versatile disc (DVD), drive apparatus thereof, and the like, or may be any storage medium to be used in the future.

As described above, the configuration has been described in which the function of each element of the automatic driving control planning apparatus 10 is realized by one of the hardware and the software or the like. However, the present invention is not limited to this, a part of the elements of the automatic driving control planning apparatus 10 may be realized by dedicated hardware, and another part of elements may be realized by software or the like. For example, for a part of the elements, the function can be realized by the processing circuit 50 as dedicated hardware, and for another part of elements, the function can be realized by reading out and executing the program stored in the memory 52 with the processing circuit 50 as the processor 51.

As described above, the automatic driving control planning apparatus 10 can realize the above-described functions by hardware, software or the like, or a combination thereof.

Second Embodiment

Figure 29:
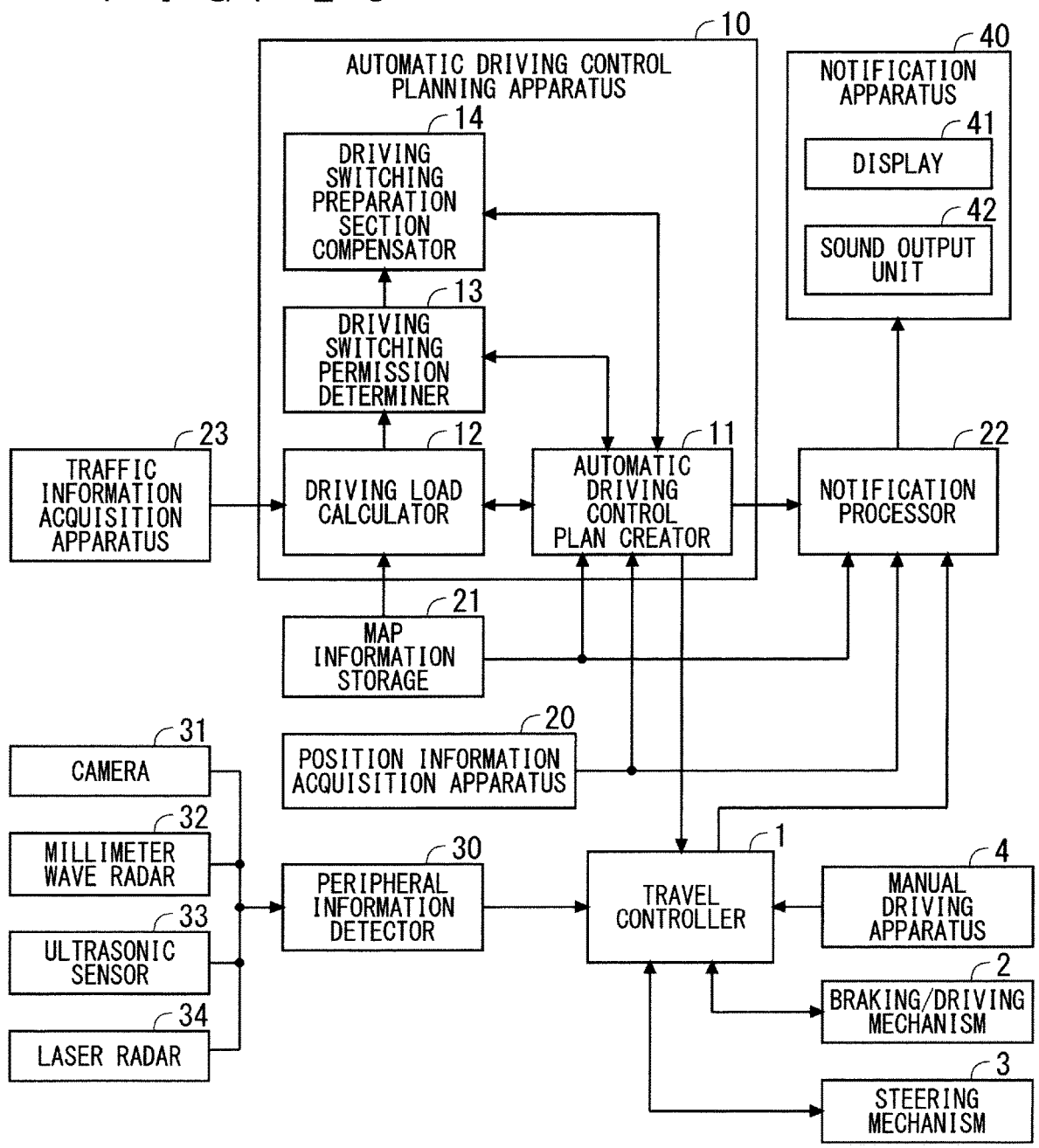
FIG. 29 is a block diagram showing a configuration of a vehicle control system according to a second embodiment.

FIG. 29 is a block diagram showing a configuration of a vehicle control system according to a second embodiment of the present invention. The configuration of the vehicle control system in FIG. 29 is a configuration in which a traffic information acquisition apparatus 23 is added to the configuration in FIG. 1. The traffic information acquisition apparatus 23 acquires traffic information such as traffic jam information, construction section information, and lane regulation information, for example. In the future, if an environment is established in which information on a current position, information on a planned traveling route, and information on a vehicle type can be acquired for all non-subject vehicles traveling on a road network from an external server, the traffic information acquisition apparatus 23 may acquire such information.

In the second embodiment, a driving load calculator 12 calculates a driving load at each section in a driving switching preparation section, in consideration of information acquired by the traffic information acquisition apparatus 23. Considering traffic information, for example, it is preferable to estimate the driving load to be higher in a traffic jam occurrence section, a construction section, a lane restriction section, and the like.

Further, from information on a current position and a planned traveling route of each of the non-subject vehicles, a situation of a non-subject vehicle that may present around the subject vehicle when the subject vehicle travels in the driving switching preparation section may be predicted, and the driving load may be calculated in consideration of the prediction result. For example, it is conceivable to detect a type of a non-subject vehicle that is predicted to be located around the subject vehicle when the subject vehicle travels in the driving switching preparation section and, for a section where a non-subject vehicle having a vehicle rank largely different from the subject vehicle (e.g., a body size and a category such as a maximum output of an engine or a motor) is predicted to be present around the subject vehicle, estimate the driving load to be higher than that in other sections.

Further, from information acquired by the traffic information acquisition apparatus 23, the driving load calculator 12 may predict a situation of automatic driving of the subject vehicle when the subject vehicle travels in the driving switching preparation section, and may calculate the driving load in consideration of the prediction result. For example, it is conceivable to estimate the driving load to be higher in a section where the subject vehicle is predicted to overtake a non-subject vehicle, or in a section where the subject vehicle is predicted to change a lane.

Except that the driving load calculator 12 calculates the driving load at each section on the basis of the information acquired by the traffic information acquisition apparatus 23, the operation of the vehicle control system is similar to that in the first embodiment (FIGS. 13 and 14). However, since traffic information and a planned traveling route of a non-subject vehicle change with time, an automatic driving control planning apparatus 10 may execute the automatic driving control planning process of FIG. 14 to update the automatic driving control plan when a change occurs in the information acquired by the traffic information acquisition apparatus 23 or at regular intervals, even after automatic driving of the subject vehicle is started.

According to the second embodiment, in consideration of traffic information, a situation of a non-subject vehicle, a situation of automatic driving of the subject vehicle, and the like, it is possible to develop an automatic driving control plan according to a situation thereof.

It should be noted that the present invention can freely combine each embodiment within the scope of the invention, and can deform or omit each embodiment as appropriate.

While this invention has been described in detail, the foregoing description is in all aspects illustrative and the invention is not limited thereto. It is understood that innumerable modifications not illustrated can be envisaged without departing from the scope of the present invention.

EXPLANATION OF REFERENCE SIGNS

1: travel controller
2: braking/driving mechanism
3: steering mechanism
4: manual driving apparatus
10: automatic driving control planning apparatus
11: automatic driving control plan creator
12: driving load calculator
13: driving switching permission determiner
14: driving switching preparation section compensator
20: position information acquisition apparatus
21: map information storage
22: notification processor
23: traffic information acquisition apparatus
30: peripheral information detector
31: camera
32: millimeter wave radar
33: ultrasonic sensor
34: laser radar
40: notification apparatus
41: display
42: sound output unit
50: processing circuit
51: processor
52: memory
60: instrument panel
100: section display bar
100a: switching-inhibited section mark
101: subject vehicle position mark
110: map image
111: subject vehicle position mark

The invention claimed is:
1. An automatic driving control planning apparatus comprising:
an automatic driving control plan creator to create an automatic driving control plan including a plan of an automatic driving section that is a section where a subject vehicle is automatically driven, and a plan of a driving switching preparation section that is a section for switching the subject vehicle from automatic driving to manual driving at a final stage of the automatic driving section;
a driving load calculator to predict, for each point of the driving switching preparation section, a driving load applied to a driver when the driver manually drives the subject vehicle;

a driving switching permission determiner to extract, from the driving switching preparation section, a switching-inhibited section that is a section where switching from automatic driving to manual driving is not permitted, based on the driving load at each point predicted by the driving load calculator; and a driving switching preparation section compensator to change a start point of the driving switching preparation section to lengthen the driving switching preparation section in accordance with a length of the switching-inhibited section when there is the switching-inhibited section in the driving switching preparation section.

2. The automatic driving control planning apparatus according to claim 1, wherein
the driving load calculator calculates the driving load based on a road shape or a road attribute at each point of the driving switching preparation section.

3. The automatic driving control planning apparatus according to claim 1, wherein
the driving load calculator calculates the driving load in consideration of traffic information.

4. The automatic driving control planning apparatus according to claim 1, wherein
the driving load calculator predicts a situation of a non-subject vehicle that is present around the subject vehicle in traveling in the driving switching preparation section, and calculates the driving load in consideration of a prediction result of a situation of the non-subject vehicle.

5. The automatic driving control planning apparatus according to claim 1, wherein
the driving load calculator predicts a situation of automatic driving of the subject vehicle in traveling in the driving switching preparation section, and calculates the driving load in consideration of a prediction result of a situation of automatic driving of the subject vehicle.

6. The automatic driving control planning apparatus according to claim 1, wherein
the driving switching preparation section compensator determines an amount for lengthening the driving switching preparation section based on a length of the switching-inhibited section.

7. The automatic driving control planning apparatus according to claim 6, wherein
the driving switching preparation section compensator lengthens the driving switching preparation section by a same length as the switching-inhibited section.

8. The automatic driving control planning apparatus according to claim 6, wherein
the driving switching preparation section compensator lengthens the driving switching preparation section by a length shorter than the switching-inhibited section.

9. The automatic driving control planning apparatus according to claim 6, wherein
when a length of the switching-inhibited section is shorter than a predetermined threshold value, the driving switching preparation section compensator does not lengthen the driving switching preparation section.

10. The automatic driving control planning apparatus according to claim 6, wherein
when a length of the driving switching preparation section excluding the switching-inhibited section is longer than a predetermined threshold value, the driving switching preparation section compensator does not lengthen the driving switching preparation section.

11. The automatic driving control planning apparatus according to claim 1, further comprising:
a notification processor to notify the driver that the subject vehicle enters the driving switching preparation section, by using a notification apparatus that notifies the driver.

12. The automatic driving control planning apparatus according to claim 11, wherein
a notification that the subject vehicle enters the driving switching preparation section is performed at a timing before the subject vehicle enters the driving switching preparation section.

13. The automatic driving control planning apparatus according to claim 1, further comprising:
a notification processor to notify the driver of whether or not the subject vehicle is located within the switching-inhibited section, by using a notification apparatus that notifies the driver.

14. The automatic driving control planning apparatus according to claim 13, wherein
the notification apparatus includes a display; and
the notification processor causes the display to display an image showing a positional relationship between the subject vehicle and the switching-inhibited section.

15. The automatic driving control planning apparatus according to claim 14, wherein
an image showing a positional relationship between the subject vehicle and the switching-inhibited section is an image obtained by synthesizing an image showing a position of the subject vehicle on an image linearly representing the driving switching preparation section including the switching-inhibited section.

16. The automatic driving control planning apparatus according to claim 15, wherein
the notification processor displays an image showing a position of the subject vehicle at a fixed position on a screen of the display, and causes an image linearly representing the driving switching preparation section to be scrolled in accordance with a change of a position of the subject vehicle.

17. The automatic driving control planning apparatus according to claim 14, wherein
an image showing a positional relationship between the subject vehicle and the switching-inhibited section is a map image showing a position of the subject vehicle and a position of the switching-inhibited section.

18. The automatic driving control planning apparatus according to claim 17, wherein
the notification processor causes the map image to be scrolled in accordance with a change of a position of the subject vehicle.

19. The automatic driving control planning apparatus according to claim 14, wherein
the display is disposed in an instrument panel of the subject vehicle.

20. An automatic driving control planning method comprising:
creating an automatic driving control plan including a plan of the automatic driving section that is a section where a subject vehicle is automatically driven, and a plan of a driving switching preparation section that is a section for switching the subject vehicle from automatic driving to manual driving at a final stage of the automatic driving section;
predicting, for each point of the driving switching preparation section, a driving load applied to a driver when the driver manually drives the subject vehicle;

extracting, from the driving switching preparation section, a switching-inhibited section that is a section where switching from automatic driving to manual driving is not permitted, based on the predicted driving load at each point; and
changing a start point of the driving switching preparation section to lengthen the driving switching preparation section in accordance with a length of the switching-inhibited section when there is the switching-inhibited section in the driving switching preparation section.

* * * * *